United States Patent
Goben

(10) Patent No.: US 10,158,639 B1
(45) Date of Patent: Dec. 18, 2018

(54) DATA SCRUBBING VIA TEMPLATE GENERATION AND MATCHING

(71) Applicant: STATE FARM MUTUAL AUTOMOBILE INSURANCE COMPANY, Bloomington, IL (US)

(72) Inventor: Marshella M. Goben, LeRoy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 261 days.

(21) Appl. No.: 15/093,298

(22) Filed: Apr. 7, 2016

Related U.S. Application Data

(60) Provisional application No. 62/296,916, filed on Feb. 18, 2016.

(51) Int. Cl.
*H04L 29/06* (2006.01)
*H04L 12/58* (2006.01)
*G06F 17/30* (2006.01)

(52) U.S. Cl.
CPC .............. *H04L 63/10* (2013.01); *H04L 51/08* (2013.01); *H04L 51/12* (2013.01); *G06F 17/30011* (2013.01); *G06F 17/30029* (2013.01); *G06F 17/30699* (2013.01); *G06F 17/30761* (2013.01)

(58) Field of Classification Search
CPC ........ H04L 63/10; H04L 51/08; H04L 51/12; H04L 29/06; H04L 12/58; G06F 17/30; G06F 17/30699; G06F 17/30011; G06F 17/30029; G06F 17/30761
See application file for complete search history.

(56) References Cited

U.S. PATENT DOCUMENTS

| | | | | |
|---|---|---|---|---|
| 7,403,901 B1* | 7/2008 | Carley | ............ | G06F 17/30306 705/2 |
| 2006/0048224 A1* | 3/2006 | Duncan | ................... | G06F 21/10 726/22 |
| 2006/0075228 A1* | 4/2006 | Black | .................. | H04L 63/0428 713/167 |
| 2011/0295842 A1* | 12/2011 | King | ................. | G06F 17/30011 707/722 |
| 2012/0117080 A1* | 5/2012 | Lamanna | .......... | G06F 17/30613 707/747 |
| 2013/0304742 A1* | 11/2013 | Roman | ............. | G06F 17/30598 707/740 |

* cited by examiner

*Primary Examiner* — Jayesh M Jhaveri
(74) *Attorney, Agent, or Firm* — Marshall, Gerstein & Borun LLP; Randall G. Rueth

(57) ABSTRACT

Techniques are described relating to the detection of personal information that may be sent to parties outside of an organization. Techniques may include comparing portions of emails to several file templates to calculate a document exposure score. The document exposure score may indicate an overall similarity based upon the presence of a number of common items such as graphics, words, form fields, etc. When the document exposure score for a particular sent email is greater than a threshold value, the sent email may be re-routed and quarantined instead of being transmitted outside of the organization's local network. A secondary determination may also be performed that identifies personal information when a matching file template is not initially found and, if so, adds a new file template to a template database to improve the performance and accuracy of the system over time.

21 Claims, 6 Drawing Sheets

Rule Name [_____]   Add Severity

Severity

Default  [High ▼] — 404

Conditions

Content Matches Document Signature From Annual credit 441719 pro form.

Minimum Document Exposure  [Exact ▼]

Match Counting:  ● Check for existence (don't count multiple matches)
                 ○ Count all matches Match On:  ☐ Envelope
           ☐ Subject
           ☑ Body
           ☑ Attachments Also Match: [Match...]   [▶]   Add 400, 402, 406, 408

*FIG. 4A*

Add Detection Rule

| Rule Type | Product | Technology |
|---|---|---|
| Content | | |
| ○ Content Matches Regular Expression<br>*Detect incidents using regular expressions.* | | (DCM) |
| ○ Content Matches Exact Data From: [BankSecureServerNamesIPS ▼]<br>*Detect incidents from exact data profiles. Select the appropriate exact data profile.* | | (EDM) |
| ○ Content Matches Keyword<br>*Detect incidents containing keywords or keyphrases.* | | (DCM) |
| ○ Content Matches Document Signature From:<br>[4-Point Inspection ▼]<br>*Match content contained in indexed document profile.* | | (IDM) |
| ○ Content Matches Data Identifier: [Choose Datadata Identifier... ▼]<br>*Detect incidents by using searching for data identifiers.* | | (DCM) |
| ○ Detect using Vector Machine Learning profile: [test ▼]<br>*Detect incidents by using Vector Machine Learning profile to classify contents* | | (VML) |
| File Properties | | |
| ○ Message Attachment or File Type Match<br>*Use this rule to find specific types of documents, such as Office or PDF files.* | | (DCM) |
| ○ Message Attachment or File Size Match<br>*Match attachment or files over or under a certain size.* | | (DCM) |
| ○ Message Attachment or File Name Match<br>*Match attachment filenames by exact name or by pattern.* | | (DCM) |

450 → ; 452 (Content rows); 454 (File Properties rows)

*FIG. 4B*

DATA SCRUBBING VIA TEMPLATE GENERATION AND MATCHING

CROSS REFERENCE TO RELATED APPLICATIONS

This application claims the benefit of U.S. Provisional Patent Application No. 62/296,916, entitled "Data Scrubbing Via Template Generation And Matching," filed Feb. 18, 2016, the disclosure of which is hereby expressly incorporated by reference in its entirety.

FIELD OF THE DISCLOSURE

The present disclosure relates to systems, methods, apparatus, and non-transitory computer readable media to scrub data and to contain certain types of data inside of an organization and, more particularly, to using template matching to identify and quarantine outgoing emails that include particular types of data addressed to persons outside of the organization.

BACKGROUND

Several types of organizations often use various reports as part of their daily business activities. In doing so, the organization may send emails with unredacted or unedited file attachments to third party partners or other groups outside of the organization. Therefore, such data transmissions may potentially open the organization up to fines or other legal liabilities. Furthermore, because traditional filtering software or firewall systems may only scan for keywords or file types (e.g., .exe files) and not the overall content of emails, many unredacted or unedited file attachments may pass through such filtering systems undetected.

BRIEF SUMMARY

Method, apparatus, systems, and non-transitory media are described that may, inter alia, prevent unredacted or unedited file attachments from being emailed outside of a local network associated with an organization. A user may setup, install, or otherwise configure one or more external computing devices (e.g., a server) as a gateway that processes emails addressed to persons outside of the organization to identify the presence of specific types of information and, if found, re-routes and quarantines such emails, thereby preventing them from being transmitted outside of the organization.

To do so, embodiments include the external computing device storing or accessing a database of several redacted file templates, which may generated from known file templates that have a specific formatting of graphics, logos, form fields, keywords, etc. A user may configure the external computing device to specify various rule parameters that may indicate which portions of email messages are to be compared to the stored file templates. Furthermore, a user may specify rule parameters such as the type of content to analyze in the matching process (within the specified email portions), and the type of file attachments that, if present, trigger the comparison process. The comparison process may then (i) compare content included in the portions of a sent email as specified by the rule parameters, and (ii) compare content included in these portions of the sent email in a manner specified by the rule parameters to calculate an initial document exposure score, which may be a scaled percentage that indicates, for a higher percentage value, a greater similarity between the content included in the portions of the sent email messages and the content included in each of the plurality of file templates to which these email portions are compared. In the event that one or more comparisons results in a document exposure score exceeding a minimum document exposure threshold, the external computing device may cause the email to be re-routed and quarantined inside the local organization as opposed to being sent outside of the organization as addressed.

Furthermore, embodiments include the external computing device flagging the sent email message as being potentially safe in the event that the one or more comparisons do not result in a document exposure score exceeding a minimum document exposure threshold, and performing a secondary message check on such flagged email messages. In some embodiments, this secondary comparison may be based upon a different type of comparison than the initial template comparison, such as a keyword comparison, for example, that results in the calculation of a secondary document exposure score. Upon the secondary document exposure score exceeding a detection threshold, the potentially safe sent email message may also be re-routed and quarantined inside the local organization as opposed to being sent outside of the organization as addressed.

In addition, embodiments include the comparison process providing more accurate results over time, as the pool of known file templates may be increased as new file template formats are identified and added. For example, in the event that a sent email message is flagged as being potentially safe but is still re-routed and quarantined, the relevant portion of the email (e.g., the file attachment) may be used to generate a new redacted file template. The new redacted file template may be generated, for example, by removing personal information identified in the relevant portions of the potentially safe sent email message, which is then added to the pool of stored file templates. In this way, if a similar email to the one previously flagged as potentially safe is subsequently sent, the initial comparison will yield an initial document exposure score exceeding the minimum document exposure threshold, obviating the need to perform the secondary comparison. Thus, the performance of the system is thereby improved over time.

In one aspect, a computer-implemented method of preventing transmission of unredacted or unedited file attachments outside of a local organization may be provided. The method may include (1) generating a plurality of redacted file templates, each of the plurality of redacted file templates matching a format of a respective known file and not containing personal information; (2) generating a detection rule specifying one or more parameters that indicate how to match sent email messages that are addressed to parties outside of the local organization to one or more of the plurality of redacted file templates; (3) detecting whether a sent email addressed to a party outside of the local organization contains an unredacted file containing personal information in accordance with the one or more parameters specified by the detection rule; and (4) when the sent email contains an unredacted file, re-routing the sent email within the local organization to prevent the sent email from being routed outside of the organization as addressed. The method may include additional, less, or alternate actions, including those discussed elsewhere herein.

In another aspect, a non-transitory computer readable media may be described having instructions stored thereon in a computing device to prevent transmission of unredacted or unedited file attachments outside of a local organization that, when executed by a processor, cause the processor to:

(1) generate a plurality of redacted file templates, each of the plurality of redacted file templates matching a format of a respective known file and not containing personal information; (2) generate a detection rule specifying one or more parameters that indicate how to match sent email messages that are addressed to parties outside of the local organization to one or more of the plurality of redacted file templates; (3) detect whether a sent email addressed to a party outside of the local organization contains an unredacted file containing personal information in accordance with the one or more parameters specified by the detection rule; and (4) when the sent email contains an unredacted file, re-route the sent email within the local organization to prevent the sent email from being routed outside of the organization as addressed. The non-transitory computer readable media may include instructions with additional, less, or alternate functionality, including that discussed elsewhere herein In yet another aspect, a data loss prevention (DLP) engine may be described including (1) a memory unit configured to store a plurality of redacted file templates, and (2) a processor configured to: (i) generate the plurality of redacted file templates, each of the plurality of redacted file templates matching a format of a respective known file and not containing personal information; (ii) generate a detection rule specifying one or more parameters that indicate how to match sent email messages that are addressed to parties outside of the local organization to one or more of the plurality of redacted file templates; (iii) detect whether a sent email addressed to a party outside of the local organization contains an unredacted file containing personal information in accordance with the one or more parameters specified by the detection rule; and (iv) when the sent email contains unredacted or unedited file attachments, re-route the sent email within the local organization to prevent the sent email from being routed outside of the organization as addressed. The DLP engine may include additional, fewer, or alternate components, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein:

FIG. 4A illustrates an exemplary screenshot 400 to facilitate user specification of rule parameters directed to detection conditions in accordance with one aspect of the present disclosure;

FIG. 4B illustrates an exemplary screenshot 450 to facilitate user specification of rule parameters directed to message content and file attachment types in accordance with one aspect of the present disclosure.

Figure 1:
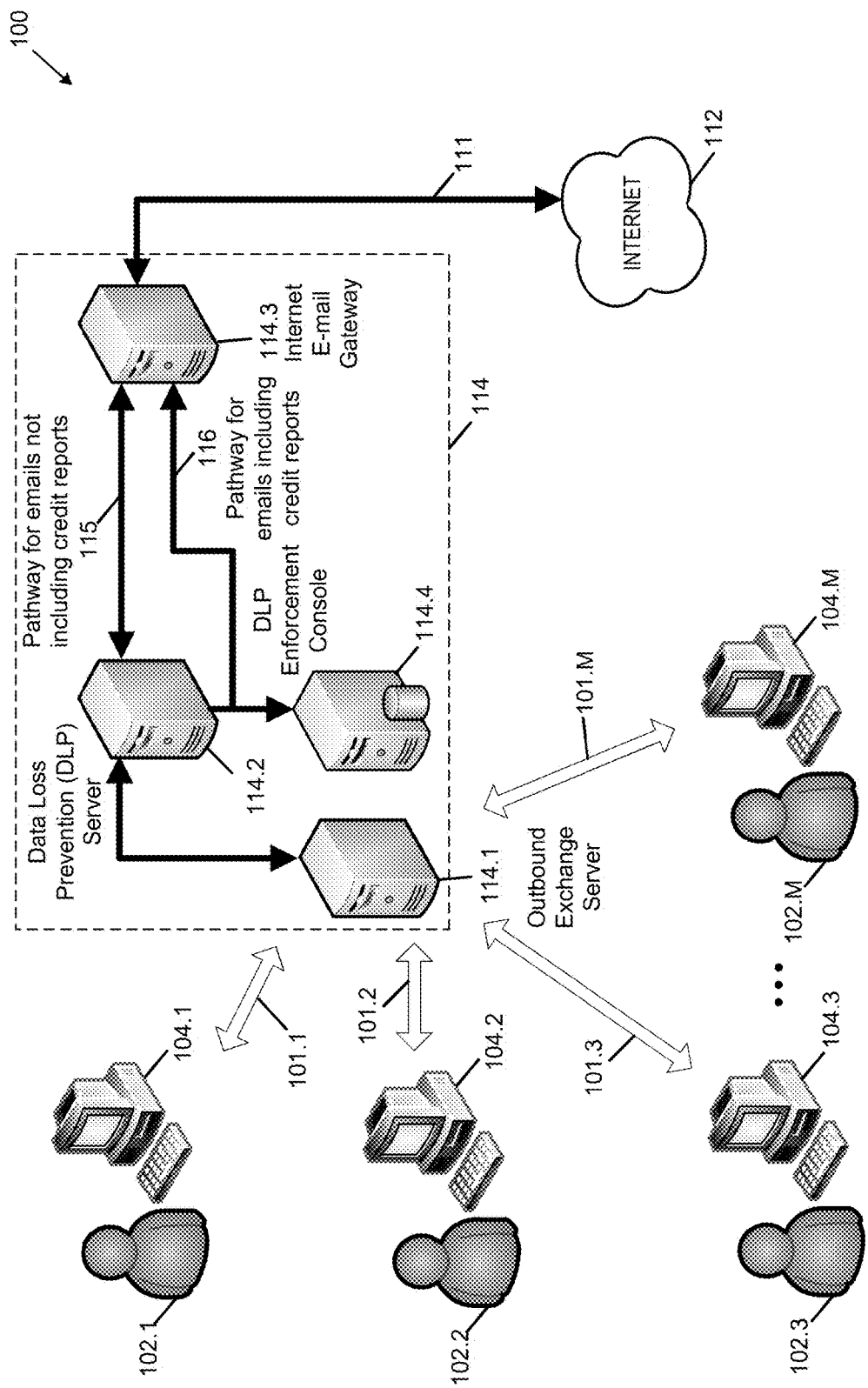
FIG. 1 illustrates a block diagram of an exemplary email message containment system 100 in accordance with one aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

Various embodiments are described herein related to the identification of email messages that may include sensitive data, and the re-routing and/or quarantining of such messages. As further explained below, businesses may use personal information for various purposes, such as running credit reports, determining the risk of insuring a particular person or property, calculating the risk (and thus an interest rate) associated with providing a loan to a person or other business, etc.

Although businesses may obtain and use this type of information in good faith, sensitive information that is transmitted outside of an organization's internal network may be prone to being intercepted by other parties and used for nefarious purposes. Furthermore, the very act of transmitting certain types of information outside of an organization may expose the business to potential liability, such as violations of the Fair Credit Reporting Act, for example.

Therefore, it is advantageous and prudent for businesses to monitor and identify emails that potentially include sensitive information so that such emails may be effectively quarantined or otherwise contained within the organization's local network system. Although traditional anti-virus systems monitor emails, they do so with a different goal in mind—to identify malicious files or other attachments to contain the spread of such emails through a quarantining procedure. To accomplish this, anti-virus systems typically scan portions of emails against known viruses, worms, Trojan horses, and other types of malware. Anti-virus systems may also implement "heuristic" scanning methods, checking programs for certain types of behavior indicative of a potential new, unknown virus.

However, anti-virus scanning techniques do not lend themselves well for checking the content of email messages or the content of attachments included in email messages for sensitive information. One reason for this is that identifying sensitive information typically requires knowledge of what is deemed sensitive, which may vary widely depending on the particular application, business, local laws, etc. Furthermore, anti-virus systems do not consider the look and feel of a document (e.g., a credit report) and instead function to identify threats by examining the file at a lower level.

With this in mind, the embodiments described herein overcome these and other deficiencies by utilizing a template database to which email messages, portions of email messages, and/or email message attachments, are compared.

Additional flexibility may be provided by identifying rule parameters such that, for certain types of messages, files, etc., a precise means by which the comparison should be made and/or what constitutes a "hit." In other words, the rule parameters may define whether a scan, when executed in accordance with one or more rules, results in the identification of sensitive information and what do when this occurs.

For example, if an email message is found that contains sensitive information (e.g., in the text of the email or in an attached file) then embodiments include re-routing the email message to a sever or other local network component, where it is quarantined. Upon such an occurrence, the sender or other personnel may be notified and, after some threshold time period (e.g., 10 days) the quarantined message may be deleted unless otherwise rectified.

Furthermore, to better ensure that sensitive information is found and contained, multiple scans may be executed, each having different rules and different identification thresholds (i.e., document exposure scores). For instance, if sensitive information is not found in an initial scan that compares graphical features of a file to those stored in a template, a subsequent scan may do so when comparing keywords. In such a case, the file may be used to create a new template, which is then stored among the other templates in the template database. As a result, subsequent initial scans would then identify the sensitive content without the need to perform a secondary scan. In this way, the accuracy of the system identifying sensitive information improves and becomes more effective and efficient over time.

Exemplary Email Message Containment System

FIG. 1 illustrates a block diagram of an exemplary email message containment system 100 in accordance with one aspect of the present disclosure. Email message containment system 100 may facilitate the identification of email messages that are addressed to persons outside of an organization and contain credit reports with personal information, and re-routing and quarantining of such email messages. Email message containment system 100 may include any suitable number "M" of computing devices 104.1-104.M, which may be associated with each of users 102.1-102.M, respectively, a local organization network 114, and Internet 112. Email message containment system 100 may include additional, fewer, or alternate components, including those discussed elsewhere herein.

One or more computing devices 104.1-104.M may be implemented as any suitable type of computing devices that are configured to communicate with local organization network 114, exchange data with local organization network 114, and/or send emails outside of local organization network 114 (i.e., via Internet 112). For example, one or more of computing devices 104.1-104.M may be implemented as desktop workstations or desktop computers, while each of users 102.1-102.M may be an employee of the local organization associated with local organization network 114. To provide additional examples, one or more of computing devices 104.1-104.M may be implemented as a mobile computing device or a mobile device (e.g., smartphone, tablet, laptop, phablet, netbook, notebook, pager, personal digital assistant (PDA), wearable computing device, smart glasses, smart watch or bracelet, etc.), or other computing device capable of wired and/or wireless communication.

In various aspects, one or more of computing devices 104.1-104.M may be configured to communicate with any suitable number and/or type of computing device that forms one or more portions of local organization network 114 via any suitable number of wired and/or wireless links, which may be in accordance with any suitable number and/or type of communication protocols. For example, as shown in FIG. 1, each of computing devices 104.1, 104.2, 104.3, and 104.M may be configured to send data to and/or receive data from local organization network 114 via respective links 101.1, 101.2, 103.3, and 101.M. In various embodiments, links 101.1, 101.2, 103.3, and 101.M communicate with local organization network 114 to receive data from and/or send data to local organization network 114.

In an embodiment, one or more of computing devices 104.1-104.M may be configured to send internal email messages via local organization network 114 and/or to receive internal email messages via local organization network 114 from other users in the local organization (e.g., via their respective computing devices 104.1-104.M) as well as send external email messages to and/or receive external email messages from persons outside of local organization network 114 via communications with Internet 112. In accordance with such embodiments, the delivery and routing of external email messages outside of local organization network 114 may be facilitated via communications between one or more computing devices 104.1, 104.2, 104.3, and/or 104.M, and outbound exchange server 114.1, the details of which are further discussed below.

Local organization network 114 may be implemented with any suitable number and/or type of networking components to facilitate the routing of data (e.g., email messages and attachments) between various computing devices within local organization network 114 and outside of local organization network 114. Although local organization network 114 is depicted in FIG. 1 as including computing devices or severs, embodiments include local organization network 114 implementing any suitable number and/or type of networking components to facilitate data routing. For example, local organization network 114 may include any suitable number of wired and/or wireless routers, servers, gateways, databases, firewalls, network bridges, switches, cables, wired and/or wireless links, access points, etc.

In an embodiment, local organization network 114 may include an outbound exchange server 114.1, a data loss prevention (DLP) server 114.2, an internet email gateway 114.3, and a DLP enforcement console 114.4. In various embodiments, one or more of outbound exchange server 114.1, DLP server 114.2, internet email gateway 114.3, and DLP enforcement console 114.4 may be configured to execute software in accordance with any suitable development scheme and/or operating system. For example, outbound exchange server 114.1, DLP server 114.2, internet email gateway 114.3, and DLP enforcement console 114.4 may be configured to work in conjunction with one another in accordance with the Windows Server Operating System, a Linux-friendly groupware suite, etc.

Outbound exchange server 114.1 may be implemented as any suitable type of server that is configured to function as an email exchange server to route email messages received internally between one or more of computing devices 104.1-104.M and/or to route email messages sent from one or more of computing devices 104.1-104.M to one or more external computing devices (e.g., via Internet 112). For example, if an email message is sent from computing device 104.1, outbound exchange server 114.1 may receive the email message via link 101.1 and route the email message to DLP server 114.2 Furthermore, incoming email messages received via Internet 112 may be routed from internet email gateway 114.3 to DLP server 114.2, which in turn may route the email message to outbound exchange server 114.1, which routes the email message to the appropriate one or more of computing devices 104.1-104.M as addressed.

DLP server 114.2 may be configured to scan one or more outgoing email messages to identify whether the email message and/or attachment includes a credit report document or other credit report related information. In an embodiment, DLP server 114.2 may be configured to execute one or more software applications that may specify one or more rule parameters that define what portions of email messages are scanned and/or conditions that, upon being met, result in the determination that the scanned email message includes a credit report document or other credit report related information. These rule parameters are discussed in further detail below but may identify, for example, the portions of sent email messages to be scanned, the particular types of file attachments that should be scanned, and how the email message content should be compared to other types of data (e.g., credit report templates) to determine the presence of a credit report document or other credit report related information.

In an embodiment, a user (e.g., information technology (IT) personnel) may customize or otherwise setup the application data that executes on DLP server 114.2 using any suitable techniques. For example, a user may go to the location of DLP server 114.2 within the local organization (e.g., in a server room), connect a laptop or other computing device to DLP server 114.2, and upload the software application to DLP server 114.2, thereby configuring DLP server with the appropriate rule parameters. To provide another example, a user may access DLP server 114.2 via one or more of computing devices 102.1-102.M, connect to DLP server 114.2 via one or more wired and/or wireless links, and upload the application data to DLP server 114.2, thereby configuring DLP server with the appropriate rule parameters. Of course, access to DLP server 114.2 may be restricted to authorized users who may, upon providing the appropriate credentials via one or more of computing devices 102.1-102.M, access DLP server 114.2 to upload the application data.

In various embodiments, the portions of a sent email message and/or attachments thereto may be scanned via DLP server 114.2 in different ways in accordance with the specified rule parameters to attempt to determine whether a sent email message includes a credit report document or other sensitive credit report information. These scans may include, for example, an initial scan and a secondary scan. The initial scan may, for example, compare content included in portions of the sent email message (as indicated by the rule parameters) to content contained in one or more known credit report templates. The credit report templates may be stored in DLP server 114.2 and/or stored in one or more other portions of local organization network 114 accessible by DLP 114.2.

In an embodiment, the credit report templates may be generated from known credit reports having specific formatting, a certain number of pages, various graphics such as logos, certain keywords, identifiable form field data, etc. For example, many businesses that generate credit reports follow a specific look and feel, regardless of the data that may change within the same credit report that is generated by the same business—such as an individual's name, address, social security number, etc. Some examples of credit report templates may include those utilized by CoreLogic Credco, Equifax, Equifax Mortgage Solutions, Kroll Factual Data Bureau Express, Informative Research, Experian, Credit radar, CIS Solution, CTI Credit Technology, Experian Credit Tracker Report, Credit Karma, Suite Solutions, CIN Legal Data Services, Avantus, Credit Technologies, CBCInnovis, Credit Assure, CredStar, Garda, CISCO/CRDEDIT FAX, TransUnion, etc.

In an embodiment, the credit report templates may be generated from blank credit report templates or from existing (unredacted) credit reports that may have personal or otherwise sensitive information. When the credit report templates are generated from unredacted credit reports, the personal or otherwise sensitive information may be edited and/or deleted to remove such information. The process of generating the credit report templates is further discussed below.

Upon generating the credit report templates, a process that may result in a number of credit report templates on the order of several hundred (e.g., 100, 200, 300, etc.), the initial scan may be performed via DLP server 114.2 by comparing content included in portions of a sent email message attachment to content included in one or more of the credit report templates. Upon performing the initial scan, an initial document exposure score may be calculated that indicates a similarity between the particular scanned email portion to the particular credit report template to which it was compared.

For example, the initial document exposure score may be a scaled number, a percentage, etc., that indicates, for higher values, a greater similarity between the portions of the sent email message attachment and each of the compared credit report templates. The comparison may be repeated for each credit report template or until an initial document exposure score is identified, for one or more of the credit report templates, that exceeds a minimum document exposure threshold. The minimum document exposure threshold may be specified, for example, as part of the rule parameters.

Upon one of the comparisons between the sent email message attachment and one or more of the credit report templates exceeding the minimum document exposure threshold, embodiments include the sent email message being flagged as including a credit report. In such a case, DLP server 114.2 may cause the sent email message to be re-routed within the local organization network 114 in such a manner that the sent email message is not sent to the destination recipient as addressed, which is indicated in FIG. 1 as pathway 116. Such emails may instead be stored in internet email gateway 114.3 as part of a quarantining procedure for any suitable amount of time (which may also be specified in the rule parameters) until the email messages are automatically deleted or the issue is otherwise resolved.

However, in the event that a scanned email message, after being compared to one or more of the credit report templates, does not yield an initial document exposure score exceeding the minimum document exposure threshold, embodiments include DLP server 114.2 determining that the scanned sent email message is a "safe" email message, and does not include a credit report document or other unredacted credit report information. Thus, in accordance with such embodiments, DLP server 114.2 may cause the sent email message to be routed to the destination recipient outside the organization as addressed, which is indicated in FIG. 1 as pathway 115, pending a final AV scan.

However, in other embodiments, if the comparison of a sent email message does not yield an initial document exposure score exceeding the minimum document exposure threshold, DLP server 114.2 may flag the sent email as being potentially safe pending the outcome of a secondary scan, which calculates a secondary document exposure score. In an embodiment, DLP server 114.2 may scan a potentially safe sent email message to calculate a secondary document exposure score using a different scanning technique than that used to calculate the initial document exposure score. For example, DLP server 114.2 may scan the potentially safe sent email message by comparing words contained in the scanned portion of the sent email message to keywords and/or form fields that are commonly associated with credit reports (e.g., "credit score," "Experian," "social security number," etc.). Based upon the comparison, a secondary document exposure score may be calculated and compared to a detection threshold, which may also be specified in the rule parameters.

As discussed above with respect to the initial document exposure score, if the secondary document exposure score is less than the detection threshold, then the potentially safe email message is considered safe, and may be routed to the destination recipient outside the organization as addressed (as indicated by pathway 115). However, if secondary document exposure score exceeds the detection threshold, then the potentially safe sent email message is considered unsafe, and the potentially safe sent email message may be re-routed within the local organization network and quarantined (as indicated by pathway 116).

Furthermore, in the event that a potentially safe sent email message is found not to be safe due to the outcome of the secondary scan, embodiments include the attachment being edited or otherwise redacted and stored as one of the credit report templates. In this way, subsequent scans of sent email messages matching the new credit report template will be identified during the initial scan, eliminating the need to perform a secondary scan and improving the performance of email message containment system 100 over time. The techniques used to generate credit report templates are further discussed herein, which apply equally to credit report templates that have been generated as part of the initial pool of credit report templates as well as those converted from credit reports identified via secondary scans that were not identified in the initial scanning process.

Regardless of how a sent email message is identified as unsafe, embodiments include DLP server 114.2 modifying the email header data in such identified email messages to identify that the sent email message has been so identified, inserting a flag as part of the email header indicating the status of the email accordingly, etc. Furthermore, embodiments include emails so identified being routed to internet email gateway 114.3.

DLP enforcement console 114.4 may be configured to notify one or more parties upon receiving an indication that an email has been re-routed from DLP server 114.2 to internet email gateway 114.3 for quarantining. In an embodiment, this identification may take place by identifying the flag and/or header information generated by DLP server 114.2, as discussed above. Furthermore, when such email messages are identified, embodiments include DLP enforcement console 114.4 logging and storing the details of the incident in any suitable format (on DLP enforcement console 114.4 or another component that is part of local organization network 114).

The details that are logged and stored may include, for example, an IP address associated with the originating computing device that sent the email message, the email address of the sender, a timestamp when the email was sent and/or when the credit report information was identified by DLP server 114.2, one or more credit report templates that triggered the respective initial document exposure score exceeding the minimum document exposure threshold and/or each respective initial document exposure score, a resulting secondary document exposure score (if applicable), etc.

Embodiments include the incident details that are logged and stored in any suitable format such that the details may be later downloaded, viewed, utilized in one or more reports generated local organization personnel, etc.

Additionally or alternatively, embodiments include DLP enforcement console 114.4 generating an alert message to notify the sender and/or other personnel in the local organization. For example, upon receiving an indication that an email has been re-routed from DLP server 114.2 to internet email gateway 114.3, DLP enforcement console 114.4 may send a notification to the sender that the sent email message has not been delivered, is currently being quarantined, and will be automatically deleted. DLP enforcement console 114.4 may also (or alternatively) send such a notification to the appropriate personnel in the local organization (e.g., IT or management personnel).

Internet email gateway 114.3 may be configured to perform anti-viral email scanning for outgoing and/or incoming email messages, and to quarantine unsafe sent email messages that have been identified by DLP server 114.2. For example, a user may specify one or more quarantining parameters that are utilized by internet email gateway 114.3 to determine how to handle unsafe sent email messages identified by DLP server 114.2. These quarantining parameters may be specified, for example, as part of the rule parameters utilized by DLP server 114.2, and in such a case may be communicated from DLP server 114.2 to internet email gateway 114.3 via any suitable communication protocols.

To provide another example, a user may utilize a direct connection to internet email gateway 114.3 and/or a connection facilitated via one or more computing devices 104.1-104.M (as discussed above with respect to the entry of rule parameters in conjunction with application data sent to DLP server 114.2) to specify the one or more quarantining parameters that are utilized by internet email gateway 114.3 via a suitable user interface.

The quarantining parameters may include, for example, a time period to quarantine (i.e., store) unsafe sent email messages on internet email gateway 114.3 before they are deleted (e.g., 4 days, 5 days, 1 week, etc.), and/or appropriate actions to take after expiration of a quarantine period (e.g., deleting email messages, forwarding email messages to the appropriate personnel within the local organization, moving the email message to another server or network location, etc.).

Additionally or alternatively, internet email gateway 114.3 may scan email messages and/or attachments using any suitable scanning techniques, which may be performed independently of the credit report scanning processes performed by DLP server 114.2. In an embodiment, internet email gateway 114.3 may act as a secondary and final barrier between local organization network 114 and Internet 112 for sent email messages addressed to recipients outside of the local organization. internet email gateway 114.3 may scan safe sent email messages (i.e., following pathway 115) as well as unsafe sent email messages that may have initially contained credit reports but have later been released from quarantine by internet email gateway 114.3 (i.e., following pathway 116), which may still contain viruses or other threats upon being delivered outside the organization as addressed. Of course, internet email gateway 114.3 may also function to perform anti-virus scanning for all email messages circulated internally within local organization network 114.

Exemplary Data Loss Prevention Engine

Figure 2:
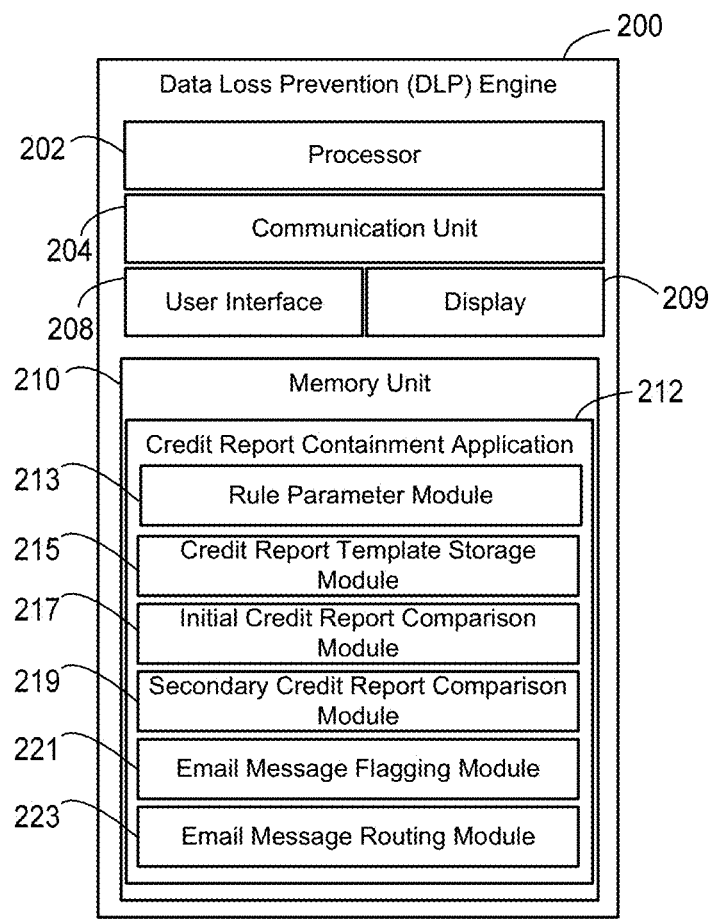
FIG. 2 illustrates a block diagram of an exemplary data loss prevention (DLP) engine 200 in accordance with one aspect of the present disclosure.

FIG. 2 illustrates a block diagram of an exemplary data loss prevention (DLP) engine 200 in accordance with one aspect of the present disclosure. In an embodiment, DLP engine 200 may include a processor 202, a communication unit 204, a routing unit 206, a user interface 208, a display 209, and a memory unit 210. DLP engine 200 may include additional, fewer, or alternate components, including those discussed elsewhere herein.

DLP engine 200 may be implemented as any suitable computing device. In various aspects, DLP engine 200 may be implemented within or as part of a server, a desktop computer, etc. In one aspect, DLP engine 200 may be an implementation of DLP server 114.2, as shown and discussed with reference to FIG. 1.

Communication unit 204 may be configured to facilitate data communications between DLP engine 200 and one or more components of a local organization network (e.g., local organization network 114, as shown in FIG. 1) and/or other internal or external networks. Communication unit 204 may be configured to facilitate communications between one or more networks and/or network components in accordance with any suitable number and/or type of communication protocols, which may be the same communication protocols as one another or different communication protocols based upon the particular network component and/or network that DLP engine 200 is communicating.

In the present aspects, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, etc. Communication unit 204 may optionally enable communications between DLP engine 200 and one or more network components and/or networks, such as one or more network components included in local organization network 114, for example, as previously discussed with reference to FIG. 1.

Communication unit 204 may send and/or receive data in accordance with one or more applications (e.g., web-based applications) hosted on DLP engine 200, and may facilitate data communications between DLP engine 200 and one or more devices (e.g., one or more computing devices 104.1-104.M, outbound exchange server 114.1, DLP enforcement console 114.4, internet email gateway 114.3, Internet 112, etc.) to support the functionality of such hosted applications. For example, communication unit 204 may send data that enables one of more devices and/or network components to display one or more prompts, options, and/or selections in accordance with such applications, thereby allowing users to specify, for example, the rule parameters for the determination of whether sent email messages are safe or unsafe.

Furthermore, communication unit 204 may be configured to receive data from one or more devices such as user selections and answers to prompts including, for example, the aforementioned the rule parameters. The received rule parameters and/or other data received from other computing devices and/or network components may then be stored in any suitable portion of memory unit 210, for example. This data may be accessible and available to the various software applications stored on memory unit 210 and executed by processor 202 such that the various functions of the embodiments as described herein may be carried out as needed.

User interface 208 may be configured to allow a user to interact with DLP engine 200. For example, user interface 208 may include a user-input device such as an interactive portion of display 209 (e.g., a "soft" keyboard displayed on display 209), an external hardware keyboard configured to communicate with DLP engine 200 via a wired or a wireless connection, one or more keyboards, keypads, an external mouse, or any other suitable user-input device.

Display 209 may be implemented as any suitable type of display and may facilitate user interaction with DLP engine 200 in conjunction with user interface 208. For example, display 209 may be implemented as a capacitive touch screen display, a resistive touch screen display, etc. In various embodiments, display 209 may be configured to work in conjunction with processor 202 and/or user interface 208 to display various prompts, selections, etc., such as those with respect to rule parameters utilized by DLP engine 200, which are received via user interface 208 and stored in any suitable portion of memory 210, as discussed above. However, in embodiments in which a user connects to DLP engine 200 via a separate device (e.g., a laptop, one of computing devices 104.1-104.M, etc.) to specify the various rule parameters, user interface 208 and/or display 209 may not be needed and thus may be omitted.

Processor 202 may be implemented as any suitable type and/or number of processors, such as a host processor for the relevant device in which DLP engine 200 is implemented, for example. Processor 202 may be configured to communicate with one or more of communication unit 204, user interface 208, display 209, and/or memory unit 210 to send data to and/or to receive data from one or more of these components.

For example, processor 202 may be configured to communicate with memory unit 210 to store data to and/or to read data from memory unit 210. In accordance with various aspects, memory unit 210 may be a computer-readable non-transitory storage device, and may include any combination of volatile (e.g., a random access memory (RAM)), or a non-volatile memory (e.g., battery-backed RAM, FLASH, etc.). In an embodiment, memory unit 210 may be configured to store instructions executable by processor 202. These instructions may include machine readable instructions that, when executed by processor 202, cause processor 202 to perform various acts.

Credit report containment application 212 may be a portion of memory unit 210 that is configured to store instructions that, when executed by processor 202, cause processor 202 to execute one or more supporting algorithms or modules, which may include, for example, rule parameter module 213, credit report storage module 215, initial credit report comparison module 217, secondary credit report comparison module 219, email message flagging module 221, and/or email message routing module 223.

The functionality discussed herein with reference to credit report containment application 212 may be facilitated by any suitable combination of computing devices. For example, in some embodiments, credit report containment application 212 (and one or more modules thereof) may be stored and executed on DLP engine 200. However, in other embodiments, credit report containment application 212 (and one or more modules thereof) may be stored and/or executed on a separate computing device, which is used to access DLP engine 200 to facilitate the same functionality as if credit report containment application 212 had been executed locally via DLP engine 200. To provide an illustrative example, a user may utilize a computing device (e.g., one or computing devices 104.1-104.M) to specify rule parameters, which are then stored on memory unit 210 and used by one or more of credit report storage module 215, initial credit report comparison module 217, secondary credit report comparison module 219, email message flagging module 221, and/or email message routing module 223. The functions and the result of the execution of credit report containment application 212 are further discussed in detail immediately below.

In an embodiment, rule parameter module 213 may be a portion of memory unit 210 configured to store instructions that, when executed by processor 202, cause processor 202 to store the specified rule parameters for use in the comparison of sent email messages. As will discussed in further detail below with reference to FIGS. 4A and 4B, these rule parameters may include, for example, a minimum document exposure threshold to determine whether an initial comparison sent email message is unsafe, a detection threshold to determine whether a secondary comparison of a sent email message is unsafe, the portions of sent email messages having content that is to be compared to the content included in the credit report templates, the content of the sent email message to use in the comparison, the technique used to calculate the initial and secondary document exposure scores, the types of file attachments that qualify for the initial scanning process, etc.

In an embodiment, credit report template storage module 215 may be a portion of memory unit 210 configured to store instructions that, when executed by processor 202, cause processor 202 to generate and/or store one or more credit report templates. Again, these credit report templates may be stored locally at DLP engine 200 in any suitable portion of memory unit 210 and/or stored in one or more networking components of the local organization network, which may be accessed by DLP engine 200, for example, via communication unit 204.

In an embodiment, a user may create one or more credit report templates via a manual process, which is discussed in further detail below with reference to FIG. 3. In embodiments in which one or more credit report templates are manually generated by a user, credit report template storage module 215 may, when executed by processor 202, facilitate instructions to be communicated to a suitable computing device that is utilized by the user in accordance with the manual template creation process. For example, if a user is generating the credit report templates manually at DLP engine 200, then credit report template storage module 215 may facilitate instructions to be displayed via display 209. To provide another example, if a user is using a computer that is communicatively coupled to DLP engine 200 to manually generate one or more credit report templates, then credit report template storage module 215 may facilitate interaction between the remote computing device and DLP engine 200 such that DLP engine 200 may receive and store each generated credit report template in a location that is accessible by DLP engine 200.

Additionally or alternatively, credit report template storage module 215 may, when executed by processor 202, partially or completely automate the process of generating redacted credit report templates from unredacted versions thereof. For example, as will be discussed with further detail below with reference to FIG. 3, a user may utilize different applications to edit unredacted credit report templates to generate redacted versions, and store these redacted versions as credit report templates for use in the initial comparison scans. In an embodiment, this process may be semi-automated or fully automated, converting an unredacted credit report file to a redacted credit report template with little or no user intervention.

In various embodiments, credit report template storage module 215 may, when executed by processor 202, allow for new credit report templates to be added to the existing pool of stored credit report templates. For example, as discussed above with reference to FIG. 1, potentially safe sent email messages may, when subjected to the secondary scan, result in the identification of a credit report file that is not stored among a current pool of credit report templates. In such a case, once the file is identified (i.e., after the secondary credit report comparison scan completes and yields a secondary document exposure score exceeding a detection threshold specified in the rule parameters) credit report template storage module 215 may facilitate processor 202 converting the identified file to a new credit report template. Processor 202 may then automatically store the new credit report template with the existing credit report templates. Subsequent initial credit report comparisons will then utilize the newly added credit report template, potentially identifying similar email messages in the initial scan versus the secondary scan.

Additionally or alternatively, when a credit report template that is not stored among a current pool of credit report templates is identified in the secondary credit report comparison scan, credit report template storage module 215 may facilitate a message being displayed, a notification being sent, instructions being displayed, etc. These instructions, messages, etc., may allow a user to manually convert the identified file to a new credit report template and to store the new credit report template with the existing credit report templates in the same manner that was done to build the initial pool of credit report templates.

Initial credit report comparison module 217 may be a portion of memory unit 210 that is configured to store instructions that, when executed by processor 202, cause processor 202 to perform an initial scan of a sent email message in accordance with the specified rule parameters, calculate an initial document exposure score for each credit report template comparison that is performed, and to identify whether any of the resulting initial document exposure scores exceed a minimum document exposure threshold. For example, the rule parameters may specify that the body of email messages are to be scanned along with any file attachments. Furthermore, the rule parameters may specify a minimum document exposure of 25%, a support vector machine (SVM) profile that is used for determining a content match, and that only file attachments having a file type associated with portable document format (PDF) or word processing format (e.g., Microsoft Word), will be scanned.

Continuing this example, an initial comparison of sent email messages would be performed on the contents of the body of each sent email message to the content of each of the credit report templates, while an initial comparison would only be made for file attachments having the specified formats. Assuming that a sent email message contains a .pdf file attachment, both the body of the email and the .pdf file would be compared to the content of each credit report template in accordance with the SVM profile specified by the rule parameters.

Upon each comparison being made, DLP engine 200 may calculate an initial document exposure score (for both the body of the email and the attached file in this case). Although the total number of credit report templates may typically be on the order of several hundred, a sample of 10 credit report templates is assumed in this example for purposes of brevity. An exemplary summary of the results of the initial document exposure score calculations for 10 different types of credit reports is provided below in Table 1.

TABLE 1

| Credit Report Template Type | Initial document exposure score: email message body | Initial document exposure score: email message attachment |
|---|---|---|
| Equifax Mortgage Solutions | 21% | 18% |
| Experian | 23% | 12% |
| CIS Solution | 14% | 16.2% |
| CTI Credit Technology | 18.9% | 18.1% |
| Credit Karma | 12% | 13.5% |
| TransUnion | 22% | 21.3% |
| Kroll Factual Data Bureau Express | 19% | 17.5% |
| Experian Credit Tracker Report | 23.5% | 75% |
| Avantus | 44% | 66% |
| Garda | 22% | 14.5% |

Additional examples of various content-based comparison scoring types and their resulting score calculations are further discussed below with reference to FIG. 4B. However, the score may be calculated in accordance with any suitable scaled numeric system that indicates a similarity between the content of the relevant portion of the sent email message and the content of the credit report template to which it is was compared. For example, as shown in Table 1 above, the score may be expressed as a scaled percentage that indicates, for a higher percentage value, a greater similarity between the content of the relevant portions of the scanned sent email messages and the content of each of the plurality of credit report templates.

As shown from the results of Table 1, the comparison of the email message file attachment to the credit report template corresponding to the Experian Credit Tracker Report results in an initial document exposure score of 75%, while the comparison of the email message file attachment to the credit report template corresponding to Avantus results in an initial document exposure score of 66%. Furthermore, the comparison of the contents of the body of the email message to the credit report template corresponding to Avantus results in an initial document exposure score of 44%.

Because the rule parameters specify a minimum document exposure score of 25%, any one of these results individually would constitute a finding of an unsafe sent email message. In the event that more than one initial document exposure score exceeds the minimum document exposure score specified in the rule parameters, as is the case in this example, embodiments include DLP engine 200 logging this information so that it may be later accessed if desired. In any event, the identification of the sent email message as unsafe results in the email message being re-routing to another server or computing device where the email message is quarantined, as further discussed below.

Secondary credit report comparison module 219 may be a portion of memory unit 210 that is configured to store instructions that, when executed by processor 202, cause processor 202 to perform an secondary scan of a sent email message when the results of the initial scan do not result in the sent email message being identified as unsafe. For example, continuing the previous example, assume that the results shown in Table 1 do not include initial document exposure scores associated with the credit report templates for the Experian Credit Tracker Report and Avantus (i.e., assume these comparisons were not made).

In such a case, none of the initial document exposure scores exceed the minimum document exposure score of 25% as specified in the rule parameters. Therefore, embodiments include processor 202 determining that the sent email message is "potentially safe," pending the results of a secondary scan via execution of instructions stored secondary credit report comparison module 219. This secondary scan may include, for example, comparing the content of portions of the potentially safe email message as indicated by the rule parameters (i.e., in this case the body of the email and the file attachment) to keywords and/or form fields commonly associated with credit reports to calculate a secondary document exposure score.

The secondary document exposure score may be calculated in any suitable manner independently of the initial document exposure score, and may be compared to a detection threshold that is also specified by the rule parameters but is different than the minimum document exposure threshold. The detection threshold may be set to a threshold number of keywords or to a threshold percentage of keyword findings, as discussed in further detail below.

To provide an illustrative example, a conservative credit report containment system may specify, as part of the rule parameters, that the potentially safe sent email message may be identified as unsafe upon identifying any specific keywords or form fields via the secondary scan. For example, the rule parameters may specify keywords or form files associated with "credit report," "social security," "credit score," "Equifax," "TransUnion," etc. Upon matching any words within the body of the email or the file attachment to these keywords, the secondary document exposure score may be set to 100%. However, if no words are found, then the secondary document exposure score may be calculated as 0%. In such a case, the detection threshold may be 0%, as the existence of any keywords results in the secondary document exposure score exceeding this threshold.

To provide another illustrative example, a moderately sensitive credit report containment system may specify a detection threshold as a threshold number of keywords which, upon being identified, results in the potentially safe sent email message being identified as unsafe. In such a case, the secondary document exposure score may be represented as a total number of identified keywords instead of a percentage.

To provide yet another illustrative example, a less sensitive credit report containment system may specify a detection threshold as a percentage that represents the number of keywords identified from among the total number of words that have been scanned (e.g., 5%, 10%, etc.). Thus, the secondary document exposure score may be represented in terms of the same percentage, such that upon the secondary document exposure score exceeding the detection threshold percentage, the potentially safe sent email message is identified as unsafe.

Email message flagging module 221 may be a portion of memory unit 210 that is configured to store instructions that, when executed by processor 202, cause processor 202 to flag an identified unsafe sent email message so that the appropriate personnel are notified. For example, as discussed above with reference to FIG. 1, DLP enforcement console 114.4 may generate and send a notification upon receiving an indication that an unsafe sent email message has been identified. Furthermore, the identified unsafe email message may also be routed to internet email gateway 114.3 where the message is quarantined.

In accordance with various embodiments, processor 202 may execute instructions stored in email message flagging module 221 to facilitate DLP engine 200 modifying the email header data to identify that the sent email message has been so identified and/or inserting a flag as part of the email header indicating the status of the email. In doing so, upon identifying the unsafe sent email message, another network component within the local organization network (e.g., internet email gateway 114.3) may scan the email header to appropriately identify the email and to determine the sender to which a notification should be sent.

Email message routing module 223 may be a portion of memory unit 210 that is configured to store instructions that, when executed by processor 202, cause processor 202 to append or to facilitate the identified unsafe sent email message being routed to the proper network component. For example, processor 202 may execute instructions stored in email message routing module 223 to append or to otherwise modify the destination IP address of the sent email message. Upon appending or modifying the IP address, the original address associated with a party outside of the organization may be modified to one associated with a network component within the local organization network. To provide an illustrative example, upon processor 202 appending or modifying the IP Address associated with an identified unsafe email message, the unsafe email message may be routed to internet email gateway 114.3 along pathway 116, where it is quarantined.

Exemplary Method for Generating Credit Report Templates

Figure 3:
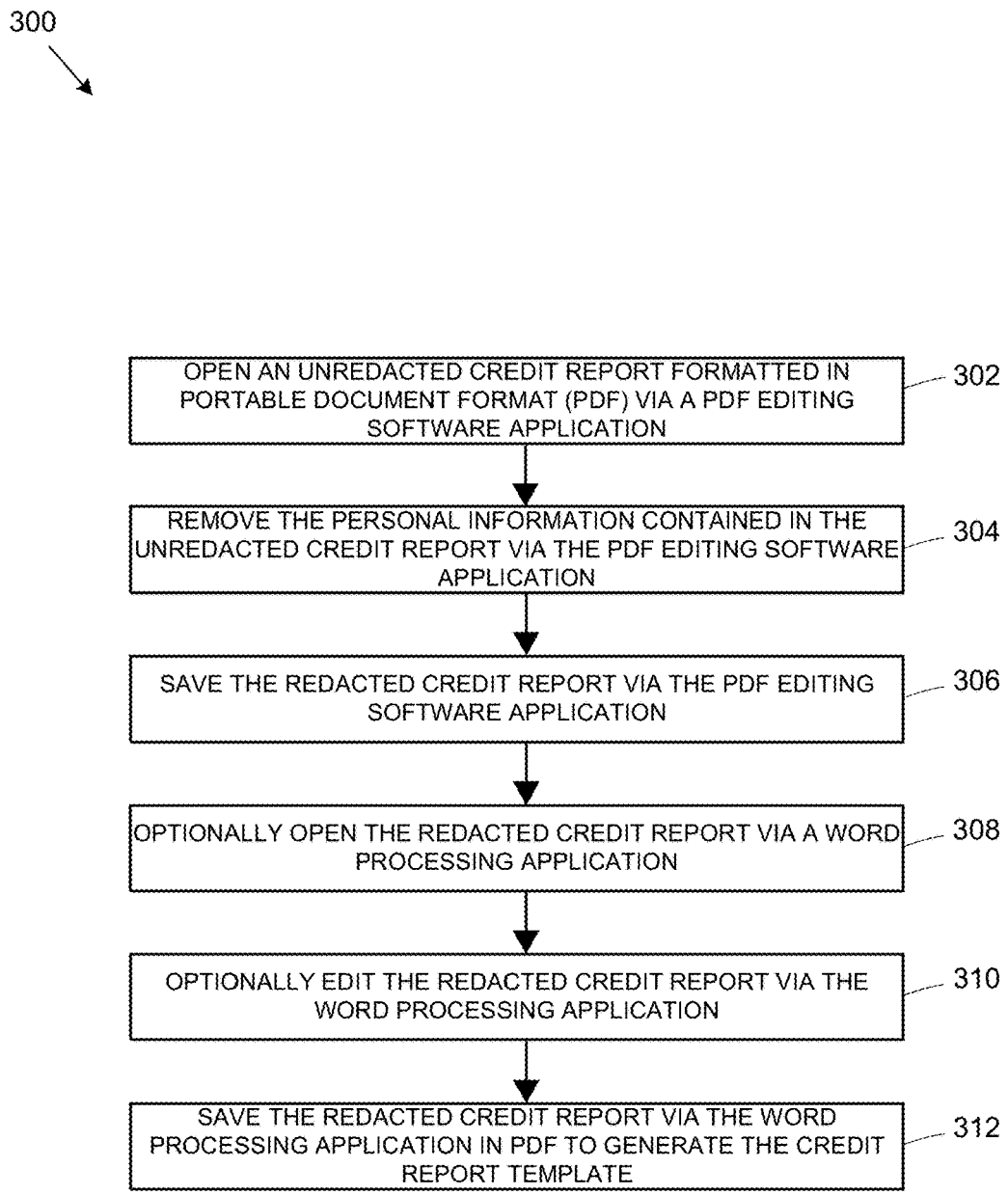
FIG. 3 illustrates an exemplary method 300 for generating credit report templates in accordance with an exemplary aspect of the present disclosure.

FIG. 3 illustrates an exemplary method 300 for generating credit report templates in accordance with an exemplary aspect of the present disclosure. In the present aspect, method 300 may be implemented by any suitable computing device (e.g., one of computing devices 104.1-104.M and/or DLP server 114.2, as shown in FIG. 1, DLP engine 200, as shown in FIG. 2, etc.). In one aspect, method 300 may be performed by one or more processors, applications, and/or routines, such as processor 202 executing credit report containment application 212 and/or instructions stored in one more modules of memory unit 210, for example, as shown in FIG. 2.

To provide another example, a user may perform some portions of method 300 manually while relying on one or more processors of relevant computing devices to perform other portions of method 300. To provide an illustrative example, several blocks described below with reference to method 300 are directed to opening, saving, and editing files. A user may manually edit files via a respective software application, while the files may be opened and/or saved via execution by one or more processors, applications, and/or routines (e.g., the execution of a batch file may automate opening and saving files in such a manner).

Method 300 may start when one or more processors open an unredacted credit report that is formatted in PDF (block 302). In an embodiment, the unredacted credit report may be opened via any suitable software application that is configured to recognize and open PDF files. For example, a user may open a sample of a credit report in PDF that is unredacted and thus includes personal information. To provide another example, the unredacted credit report file may be one identified as the result of a secondary email message scan (e.g., a potentially safe sent email message that was found to be unsafe), as discussed above with reference to FIGS. 1 and 2. In an embodiment, the PDF software application may include any suitable version of a PDF editing software application (e.g., Adobe Acrobat) that is configured to allow user editing of PDF files.

Method 300 may include one or more processors removing the personal information contained in the unredacted credit report using the PDF software application (block 304). For example, a user may remove information that has been previously entered into various form fields, which are part of the file's PDF formatting (block 304).

Method 300 may include one or more processors saving the now redacted credit report using the PDF software application (block 306). For example, a user may save the PDF file to a working directory, network storage location, and/or local storage location that is associated with or otherwise accessible by one or more computing devices (e.g., 104.1-104.M, DLP server 114.2, DLP engine 200, etc.).

Although the unredacted credit report file may have some information removed via the PDF software application, in some instances this may not result in all personal information being removed from the credit report PDF file. This may be the case, for example, when a particular form field cannot be edited, when alphanumeric strings are embedded within the PDF file, when data is not contained in a form field or is otherwise not editable via the PDF software application, etc. Therefore, method 300 may include one or more processors optionally opening the redacted credit report via a word processing application (block 308). In an embodiment, the word processing application may be configured to open a variety of different files, such as word processing formatted files that were created with the word processing application as well as PDF files that were created with a suitable PDF software application. For example, the word processing application may include Microsoft Word, which can open .pdf files, .doc files, .docx files, etc.

Upon the redacted credit report file (in PDF) being opened via a word processing application, embodiments include the redacted credit report file data being reflowed into the word processing format utilized by the word processing application. Thus, method 300 may optionally include a user and/or one or more processors further editing the redacted credit report file once the file is reflowed into an editable word processing format (block 310). For example, because word processing applications allow for greater flexibility and options in editing the contents of the redacted credit report file data upon being reflowed, additional personal information in the redacted credit report file data that could not previously be edited or removed via the PDF software application may, upon being reflowed into the word processing file format, be edited or removed via the word processing application (block 310).

Method 300 may include one or more processors saving the (now redacted) credit report using the word processing application (block 312). In an embodiment, the word processing application may be configured to not only open files of various file formats, but to likewise save files in various formats. Thus, upon any additional optional edits being made to the credit report file via the word processing application, the credit report file may be saved as a fully redacted credit report file in PDF, thereby generating a credit report template. The credit report template may be saved, for example, in any suitable location (e.g., a database or network accessible storage) such that each saved credit report template may be accessed as part of the initial email scanning process, as discussed above with reference to FIGS. 1 and 2 (block 312).

Exemplary Screenshots for Specifying Rule Parameters

FIG. 4A illustrates an exemplary screenshot 400 to facilitate user specification of rule parameters directed to detection conditions in accordance with one aspect of the present disclosure. In an embodiment, screenshot 400, as shown in FIG. 4A, as well as screenshot 450, as shown in FIG. 4B, may be an example of what may be displayed to a user on a suitable computing device to facilitate the entry of various rule parameters. For example, a user may provide the appropriate logon credentials via one of computing devices 104.1-104.M, as shown in FIG. 1, to access DLP server 114.2. In doing so, DLP server 114.2 may communicate with the computing device to provide an interactive user interface form, screenshots 400 and 450 corresponding to screenshots used in accordance with such an interactive user interface. Although screenshots 400 and 450 as explained herein facilitate the user entry of various rule parameters, the user interface that may be implemented to facilitate such functions may be of any suitable design, format, layout, etc. Thus, embodiments include user entry of rule parameters in any suitable manner, which may differ from what is illustrated in FIGS. 4A and 4B while still facilitating the same functionality regarding the specification of various rule parameters as described herein.

In an embodiment, screenshot 400 includes portions 402, 404, 406, and 408. Portion 402 may include a form field that allows a user to specify the name of the rule which is applied to email message scanning processes. For example, a user may specify rule parameters for each different type of credit report against which a sent email message is compared. In various embodiments, any suitable number of rules may be created for the comparison of sent email messages to each credit report template. For example, as shown in FIG. 4A, the rule parameters specified via screenshot 400 correspond to the comparison of sent email message content to the credit report template associated with "annual credit 441719 pro form."

Portion 404 may include a severity indicator to be associated with the rule. For example, a user may create two different rules for the same credit report template, each having different severities. The different severity levels may impact, for example, the quarantining period, the personnel in the local organization network who are notified should the rule parameters, when applied to a sent email message, result in the identification of an unsafe sent email message. To provide another example, the severity level may cause the email header to be modified in a different manner for different severities when an unsafe sent email message is detected and/or may be noted in the logged data stored in DLP enforcement console 114.4. In this way, a user may specify different levels of severity for certain specified rule parameters. To provide an illustrative example, a local organization may associate a minimum document exposure threshold of 80% as severe, while associating a minimum document exposure threshold of 25% as moderate.

Portion 406 may include various rule parameters associated with the content of the sent email message that is compared to one or more credit report templates. For example, as shown in FIG. 4A, portion 406 allows a user to specify the minimum document exposure threshold for initial sent email scan comparisons to credit report templates. In FIG. 4A, the minimum document exposure threshold is set to "exact," or 100%. However, as explained above, a user may specify any suitable number as the minimum document exposure threshold, for example, by using a drag and drop interface and/or by manually typing in the desired value.

Furthermore, a user may specify how the content of portions of a sent email are compared to content of a credit report template for purposes of calculating the initial document exposure score. For example, if the user selects the option to "check for existence," the comparison may determine whether a particular feature contained in the relevant portions of the email (e.g., keywords, logos, graphics, etc.) is found anywhere in a particular credit report template. This may result in the score calculation being either 0% (if the feature is not found) or 100% (if a single feature is found). For example, if a common graphic is found in a file attachment that matches a specific credit report template, the graphic may appear in the scanned file attachment 10 times. However, it may be desirable to identify the sent email message as unsafe when even once instance is found regardless of how many times, and therefore the determination of the number of times the graphic is repeated within the scanned email content is not needed.

To provide another example, a user may set the match counting option such that multiple feature matches in a scanned portion of an email are counted, which may be used to calculate the initial document exposure score. In an embodiment, a user may specify the match counting rule parameter in accordance with a specific type of matching process for a particular credit report template. For example, a user may set the match counting rule parameter to "check for existence" when a SVM match comparison is utilized, while specifying the match counting rule parameter as "count all matches," when a keyword match comparison is utilized. Of course, because a number of different rules may be generated for the same credit report template comparison, a user may specify different rule combinations for the same credit report template that is to be matched (e.g., two rules—one that counts matches and specifies a keyword match comparison, and another rule that does not count matches and specifies a SVM match comparison).

Portion 406 may also allow a user to specify the relevant portions of a sent email to compare to the specified credit report template. For example, as shown in FIG. 4A, a user may select from the email envelope, the email subject line, the email body, and/or email file attachments. Again, a user may specify these selections to tailor the rule parameters for specific credit report template comparisons, as some types of credit report content and/or match comparisons may lend themselves better to an analysis of certain portions of sent email messages over others. For example, keyword matching may lend itself particularly well to checking the subject and body of an email, while other types of match comparisons that utilize SVM or graphic comparisons may lend themselves better to checking email file attachments.

Portion 408 may allow a user to specify one or more additional matching rule parameters, such as keywords, for example. In some embodiments, the user may specify keywords that may be added to the match comparison of the initial sent email scan comparisons. In other embodiments, however, a user may specify keywords that are used as part of the secondary sent email scan comparisons. To provide an illustrative example, reports or log files may indicate that certain keywords are regularly identified in secondary sent email scan comparisons, causing potentially safe sent email messages to be regularly identified as unsafe when these words are found in the content of the email. In such a case, a user may modify the rule parameters such that these keywords are added to those scanned in the initial sent email scan comparisons, thereby increasing the chances that subsequent scanned emails are identified as unsafe without the need to perform the secondary sent email scan comparison.

FIG. 4B illustrates an exemplary screenshot 450 to facilitate user specification of rule parameters directed to message content and file attachment types in accordance with one aspect of the present disclosure. In an embodiment, screenshot 450 includes portions 452 and 454.

Portion 452 may allow a user to specify rule parameters regarding the how portions of the sent email messages (e.g., specified in portion 406, as shown in FIG. 4A) are compared to the content of a particular credit report template (e.g., specified in portion 406, as shown in FIG. 4A). Depending on the particular match comparison that is selected from portion 452, embodiments include the user further specifying how the match comparison may be performed in accordance with the selected option.

As shown in FIG. 4B, a user may select various matching comparison techniques, any of which result in the calculation of an initial document exposure score that is then compared to the minimum initial document exposure score (e.g., specified in portion 406, as shown in FIG. 4A). For example, a user may specify that content from the relevant portion of the sent email message is to be compared based upon a regular expression. In various embodiments, any suitable number and type of regular expressions may be entered as part of the rule parameter, which may specify a sequence of characters that define a search pattern for string matching. A user may specify the regular expressions via entry into, for example, a drop down menu, an interactive portion of the user interface corresponding to screenshots 400 and 450, etc. (not shown in FIG. 4B for purposes of brevity). Additionally or alternatively, the regular expression may be generated based upon any presently selected keywords specified by the user (e.g., entered via portion 408, as shown in FIG. 4A).

Portion 452 may also allow a user to select the option to match data from an exact data profile that is known to be associated with the particular credit report template. For example, a user may select this option and, in the drop down menu, select a data profile that may be stored in a network location that is accessible by the computing device that is performing the sent email message comparison (e.g., DLP server 114.2, DLP engine 200, etc.). The exact data profile may be particularly useful, for example, in detecting data that is in a structured or tabular format, as the exact data profile may include data in a similar format (e.g., a spreadsheet), which may be utilized or otherwise associated with particular types of credit reports.

Furthermore, portion 452 may allow a user to select the option to perform match comparisons via keywords or keyphrases, match a document signature from content contained in an indexed document profile, which may be specified by a user as shown in FIG. 4B. Portion 452 may also allow users to specify that match comparisons are performed based upon data identifiers or using a vector machine learning profile.

Portion 452 may also allow a user to identify file properties that are used for match comparisons between any sent email attachments (e.g., if specified in portion 406, as shown in FIG. 4A). For example, a user may specify rule parameters such as a type of file that qualifies for match comparison scans (e.g., .exe files, .pdf files, .docx files, .xlsx files, etc.). To provide another example, portion 452 may allow a user to specify the size of files that qualify for match comparisons (e.g., over 1 Megabyte (MB), under 500 Kilobytes (KB), etc.). To provide yet another example, portion 452 may allow a user to specify specific file names that, upon being identified, result in the email attachment being subjected to an initial match comparison scan (e.g., attachments named "credit report," "Credit_report," etc.).

Again, in various embodiments, the initial document exposure score may be calculated in any suitable manner based upon the matching comparison selected via portion 452. For example, if a keyword match comparison is selected (or a regular expression match is selected specifying keywords), the initial document exposure score may be based on a number of identified matches ("hits") as each portion of a sent email is scanned as specified by the rule parameters and/or a number of hits in proportion to the overall words that are scanned. To provide another example, if an exact data profile match comparison is selected, the initial document exposure score may be calculated based upon a proportion of the particular exact data profile that is matched to the portion of the sent email message. To provide yet another example, if a vector machine learning profile is selected, the initial document exposure score may be calculated based upon a resulting output vector.

Furthermore, although not shown in FIG. 4A or 4B for purposes of brevity, a user may utilize the user interface as described above with reference to these Figures to specify any suitable rule parameters or other data that may be relevant or otherwise useful in the identification of unsafe sent email messages. For example, a user may specify the detection threshold, which is used in conjunction with the secondary document exposure score to determine whether a sent email message is actually safe or unsafe.

Figure 5:
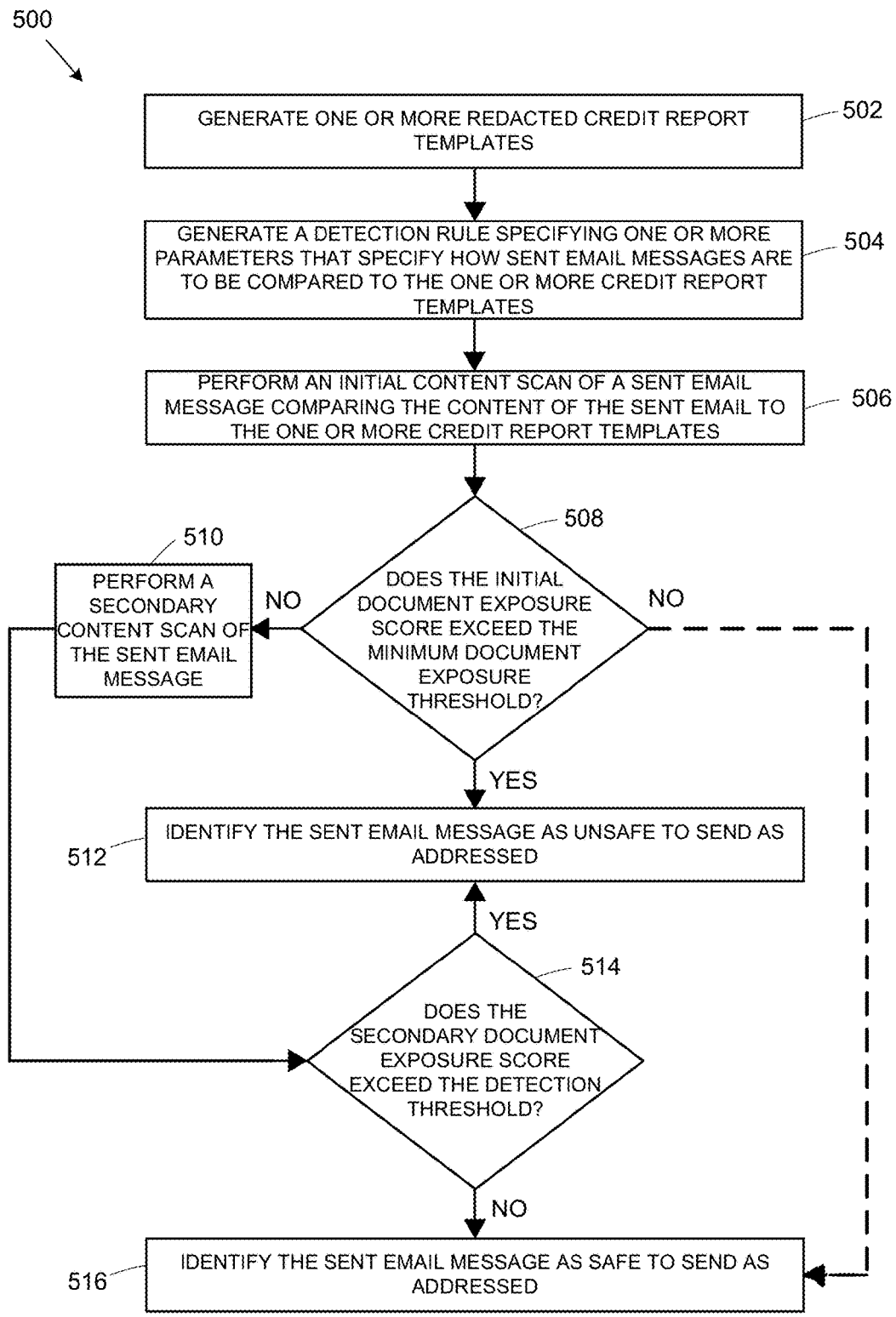
FIG. 5 illustrates an exemplary method 500 for containing sent email messages having unredacted credit report information within a local organization network.

Exemplary Method for Containing Identified Email Messages Including Sensitive Information FIG. 5 illustrates an exemplary method 500 for containing sent email messages having unredacted credit report information within a local organization network. In the present aspect, method 500 may be implemented by any suitable computing device (e.g., DLP server 114.2, as shown in FIG. 1, DLP engine 200, as shown in FIG. 2, etc.). In one aspect, method 500 may be performed by one or more processors, applications, and/or routines, such as processor 202 executing credit report containment application 212 and/or instructions stored in one more modules of memory unit 210, for example, as shown in FIG. 2.

Method 500 may start when one or more processors generate one or more redacted credit report templates (block 502). In an embodiment, the one or more redacted credit report templates may be generated in a manner previously discussed with reference to method 300, as shown in FIG. 3. For example, the one or more redacted credit report templates may be generated by one or more processors from existing, blank credit reports (block 502). To provide another example, the one or more redacted credit report templates may be generated by one or more processors as the result of a secondary email message scan (e.g., a potentially safe sent email message that was found to be unsafe) or an otherwise unredacted credit report file being edited to remove personal information (block 502).

Method 500 may include one or more processors generating a detection rule that specifies one or more rule parameters that indicate how to match sent email messages that are addressed to parties outside of the local organization to one or more of the plurality of redacted credit report templates (block 504). For example, the rule parameters may be entered by a user via a suitable computing device, as discussed above with reference to FIGS. 4A and 4B (block 504). Again, the detection rule may include various rule parameters and may be generated on a per-credit report template basis, with the rule parameters specifying how the content of a sent email message is to be compared to the content of the redacted credit report templates (block 504). In an embodiment, one or more different detection rules may be associated with a single redacted credit report template, such that the content of portions of a sent email message is compared to the content included in each redacted credit report template in accordance with the one or more detection rules associated therewith.

Method 500 may include one or more processors performing an initial content scan that compares the content of portions of a sent email message to the content in one or more credit report templates (block 506) as specified by the rule parameters associated with the one or more detection rules (block 504). In an embodiment, an initial document exposure score may be calculated based upon the initial content scan (block 506). For example, if the rule parameters specify that a keyword comparison is to be performed on the body of a sent email message, method 500 may include comparing that content to the content included in each of the one or more redacted credit report templates using keyword matching (block 506). The outcome of this keyword matching may result in the calculation of the initial document exposure score using any suitable scoring techniques, such as those discussed above with reference to FIG. 2, for example.

Method 500 may include one or more processors determining whether the initial document exposure score (block 506) exceeds a minimum document exposure threshold (block 508). For example, as discussed above with reference to FIG. 2 and Table 1, the rule parameters may specify a minimum document exposure threshold. If any of the calculated initial document exposure scores that result from the initial content scan of the sent email (block 506) result is greater than this minimum document exposure threshold, then method 500 may identify that the sent email message is unsafe to send outside of the organization as originally addressed (block 512). Otherwise, method 500 may optionally identify the sent email message as being potentially safe and proceed to perform a secondary content scan of the sent email message (block 510). In accordance with embodiments in which a secondary content scan is not performed, method 500 may proceed to identify the sent email message as safe to send as addressed when none of the calculated initial document exposure scores are greater than the minimum document exposure threshold as specified in the rule parameters (block 516).

Method 500 may include one or more processors identifying the sent email message as unsafe to send as addressed (block 512). Again, in various embodiments, such a finding may trigger one or more actions. For example, once identified, the sent email message may be flagged, the email header modified, an alert or other notification sent to the appropriate personnel, and/or the sent email message re-routed to another internal server to be quarantined (block 512).

Method 500 may include one or more processors performing a secondary content scan comparing the content of a potentially safe email message to one or more keywords and/or form fields (block 510). In an embodiment, the secondary content scan may result in the calculation of a secondary document exposure score (block 510), as discussed above, for example, with reference to FIG. 2.

Method 500 may include one or more processors determining whether the secondary document exposure score (block 510) exceeds a detection threshold (block 514), which may be specified, for example, as part of the rule parameters. If the calculated secondary document exposure score (block 510) is greater than the detection threshold, then method 500 may identify the potentially safe email message as unsafe to send outside of the organization as originally addressed (block 512). Otherwise, method 500 may proceed to identify the sent email message as safe to send as addressed (block 516).

Method 500 may include one or more processors identifying a sent email message as safe to send as addressed (block 516) when the initial content scan (block 506) and (when optionally performed) the secondary content scan (block 510) do not result in the identification of an unsafe sent email (blocks 508, 514). In such a case, method 500 may result in the sent email being routed as originally addressed to a party outside of the local organization, without interrupting or otherwise delaying its delivery.

Exemplary Technical Advantages

The embodiments described herein may be implemented as part of a computer network architecture, and thus address and solve issues of a technical nature that are necessarily rooted in computer technology. For instance, embodiments include performing specific types of tests as specified by various rule parameters based upon the portion of an email message that is scanned (e.g., the subject line, contents, attachments, etc.). In doing so, the embodiments overcome issues associated with identifying email messages in traditional ways, which scan each email message in the same manner. That is, anti-virus programs typically scan each email message in a predetermined manner, while the embodiments described herein allow users to modify rule parameters for the particular email message or to improve the accuracy in which sensitive email message content is identified over time. Without the improvements suggested herein, email scanning would be less flexible, more time consuming, and use more processing resources.

Furthermore, the embodiments described herein function to improve efficiency over time. For example, by using a two-step approach to email scanning, the system may not initially detect sensitive emails on the first scan, but detect the information during a subsequent scan of a different type and/or using a different minimum document exposure threshold. The email content for such an email, once identified, may then be added as a new template to the database of templates, which is then used for subsequent initial scanning processes. As a result, the subsequent initial email scanning procedures, by leveraging a larger pool of templates, may identify subsequent similar email messages containing sensitive information without the need to perform a second scan. Therefore, not only do the embodiments address computer-related issues regarding efficiency over traditional email scanning techniques, but they also improve over time with respect to its initial, baseline efficiency. By learning and improving over time, the embodiments address computer related issues that are related to efficiency metrics, such as consuming less power, for example.

Additionally, the embodiments described herein prevent identified email messages from being transmitted outside of an organization's local network. In doing so, the embodiments address issues related to bandwidth usage. For example, by selectively preventing some email messages from being transmitted outside of a particular network, an organization ultimately decreases its own outgoing network traffic. Because networks are designed and installed with traffic considerations as a driving factor, the embodiments also help address issues related to network bandwidth usage.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

Further to this point, although the embodiments described herein often utilize credit report information as an example of sensitive information, the embodiments described herein are not limited to such examples. Instead, the embodiments described herein may be implemented in any suitable environment in which it is desirable to identify and control specific type of information. For example, the aforementioned embodiments may be implemented by a financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

I claim:

1. A computer-implemented method of preventing transmission of personal information outside of a local organization, the method comprising:

generating, by one or more processors, a plurality of redacted file templates, each of the plurality of redacted file templates matching a format of a respective known file and not containing personal information, by removing the personal information contained in the respective known file;

generating, by one or more processors, a detection rule specifying one or more parameters that indicate which portions of sent email messages that are addressed to parties outside of the local organization when compared to one or more of the plurality of redacted file templates exceed a minimum document exposure threshold;

detecting, by one or more processors, whether a sent email addressed to a party outside of the local organization contains personal information in accordance with the one or more parameters specified by the detection rule; and when the sent email contains personal information, re-routing, by one or more processors, the sent email within the local organization to prevent the sent email from being routed outside of the organization as addressed.

2. The computer-implemented method of claim 1, wherein the personal information corresponds to unredacted or unedited information contained in a credit report, wherein each of the plurality of redacted file templates is associated with a credit report template having a respective format, and wherein generating a redacted credit report template from among the plurality of redacted credit report templates comprises:

opening an unredacted credit report, which contains personal information and is formatted in portable document format (PDF), via a first software application;

removing the personal information contained in the unredacted credit report via the first software application to generate a redacted credit report in PDF;

saving the redacted credit report in PDF via the first software application;

opening the redacted credit report in PDF with a second software application, the second software application being associated with word processing functionality, wherein upon opening the redacted credit report with the second software application, the second software application causes the redacted credit report in PDF to be reflowed and formatted into an editable word processing file; and editing and saving the redacted credit report with the second software application to generate the redacted credit report template.

3. The computer-implemented method of claim 1, wherein the personal information corresponds to unredacted or unedited information contained in a credit report, wherein each of the plurality of redacted file templates is associated with a credit report template having a respective format, and wherein generating the detection rule comprises:

specifying the portions of sent email messages to be matched to one or more of the plurality of credit report templates;

specifying content from the portions of the sent email messages to be matched to content included in one or more of the plurality of credit report templates;

specifying file properties of an attached file included in sent email messages that, when present, result in the attached file qualifying for comparison to one or more of the plurality of credit report templates; and specifying the minimum document exposure threshold between (i) content included in the portions of the sent email messages, and (ii) content included in each of the plurality of credit report templates, which results in the detection of a sent email message containing an unredacted credit report.

4. The computer-implemented method of claim 3, further comprising:

comparing the content included in portions of the sent email messages as specified by the detection rule to content included in each of the plurality of credit report templates; and calculating, for each comparison made between the content included in portions of the sent email messages and content included in each of the plurality of credit report templates, an initial document exposure score, and wherein the initial document exposure score is a scaled percentage that indicates, for a higher percentage value, a greater similarity between the content included in portions of the sent email messages and content included in each of the plurality of credit report templates.

5. The computer-implemented method of claim 3, further comprising:

comparing the content included in portions of the sent email messages as specified by the detection rule to content included in each of the plurality of credit report templates;

calculating, for each comparison made between the content included in portions of the sent email messages and content included in each of the plurality of credit report templates, an initial document exposure score;

flagging a sent email message from among the sent email messages as a potentially safe sent email message when none of the comparisons between the sent email message and each of the plurality of credit report templates yields an initial document exposure score below the minimum document exposure threshold; and calculating a secondary document exposure score based upon a presence of one or more keywords and form fields associated with credit reports contained in the portions of the potentially safe sent email message;

when the secondary document exposure score exceeds a detection threshold, re-routing, by one or more processors, the potentially safe sent email message within the local organization to prevent the potentially safe sent email message from being routed outside of the organization as addressed.

6. The computer-implemented method of claim 5, further comprising:

generating, from the portions of the potentially safe sent email message, a new redacted credit report template by removing personal information identified in the content included in portions of the potentially safe sent email message; and adding the new redacted credit report template to the plurality of redacted credit report templates.

7. The computer-implemented method of claim 1, wherein the act of re-routing the sent email within the local organization comprises:

re-routing the sent email to an internal server within the organization where the sent email is stored as part of a quarantine procedure, and further comprising:

upon the sent email being re-routed within the local organization, sending an alert message to the sender of the email notifying the sender of the quarantine status of the sent email.

8. A non-transitory, tangible computer-readable medium storing machine readable instructions that, when executed by a processor, cause the processor to:

generate a plurality of redacted credit report templates, each of the plurality of redacted credit report templates matching a format of a respective known credit report and not containing personal information, by removing the personal information contained in the respective known credit report;

generate a detection rule specifying one or more parameters that indicate which portions of sent email messages that are addressed to parties outside of the local organization when compared to one or more of the plurality of redacted credit report templates exceed a minimum document exposure threshold;

detect whether a sent email addressed to a party outside of the local organization contains an unredacted credit report containing personal information in accordance with the one or more parameters specified by the detection rule; and when the sent email contains an unredacted credit report, re-route the sent email within the local organization to prevent the sent email from being routed outside of the organization as addressed.

9. The non-transitory, tangible computer-readable medium of claim 8, wherein the instructions to generate a redacted credit report template from among the plurality of redacted credit report templates comprises instructions that, when executed by the processor, cause the processor to:

open an unredacted credit report, which contains personal information and is formatted in portable document format (PDF), via a first software application;

remove the personal information contained in the unredacted credit report via the first software application to generate a redacted credit report in PDF;

save the redacted credit report in PDF via the first software application;

open the redacted credit report in PDF with a second software application, the second software application being associated with word processing functionality, wherein upon opening the redacted credit report with the second software application, the second software application causes the redacted credit report in PDF to be reflowed and formatted into an editable word processing file; and edit and save the redacted credit report with the second software application to generate the redacted credit report template.

10. The non-transitory, tangible computer-readable medium of claim 8, wherein the instructions to generate the detection rule further include instructions that, when executed by the processor, cause the processor to:

specify the portions of sent email messages to be matched to one or more of the plurality of credit report templates;

specify content included in the portions of the sent email messages to be matched to content included in one or more of the plurality of credit report templates;

specify file properties of an attached file included in sent email messages that, when present, result in the attached file qualifying for comparison to one or more of the plurality of credit report templates; and specify the minimum document exposure threshold between (i) the content included in portions of the sent email messages, and (ii) content included in each of the plurality of credit report templates, which results in the detection of a sent email message containing an unredacted credit report.

11. The non-transitory, tangible computer-readable medium of claim 9, further storing machine readable instructions that, when executed by a processor, cause the processor to:
   compare content included in the portions of the sent email messages as specified by the detection rule to content included in each of the plurality of credit report templates; and
   calculate, for each comparison made between the content included in portions of the sent email messages and content included in each of the plurality of credit report templates, an initial document exposure score,
   wherein the initial document exposure score is a scaled percentage that indicates, for a higher percentage value, a greater similarity between the content included in portions of the sent email messages and content included in each of the plurality of credit report templates.

12. The non-transitory, tangible computer-readable medium of claim 9, further storing machine readable instructions that, when executed by a processor, cause the processor to:
   compare the content included in portions of the sent email messages as specified by the detection rule to content included in each of the plurality of credit report templates;
   calculate, for each comparison made between the content included in portions of the sent email messages and content included in each of the plurality of credit report templates, an initial document exposure score;
   flag a sent email message from among the sent email messages as a potentially safe sent email message when none of the comparisons between content included in the portions of the sent email message and content included in each of the plurality of credit report templates yields an initial document exposure score below the minimum document exposure threshold;
   calculate a secondary document exposure score based upon a presence of one or more keywords and form fields associated with credit reports contained in the content included in portions of the potentially safe sent email message; and
   when the secondary document exposure score exceeds a detection threshold, re-routing the potentially safe sent email message within the local organization to prevent the potentially safe sent email message from being routed outside of the organization as addressed.

13. The non-transitory, tangible computer-readable medium of claim 12, further storing machine readable instructions that, when executed by a processor, cause the processor to:
   generate, from the content included in portions of the potentially safe sent email message, a new redacted credit report template by removing personal information identified in the portions of the potentially safe sent email message; and
   add the new redacted credit report template to the plurality of redacted credit report templates.

14. The non-transitory, tangible computer-readable medium of claim 8, wherein the instructions re-route the sent email within the local organization further include instructions that, when executed by the processor, cause the processor to:
   re-route the sent email to an internal server within the organization where the sent email is stored as part of a quarantine procedure, and further storing machine readable instructions that, when executed by a processor, cause the processor to:
   upon the sent email being re-routed within the local organization, send an alert message to the sender of the email notifying the sender of the quarantine status of the sent email.

15. A data loss prevention engine, comprising:
   a memory unit configured to store a plurality of redacted credit report templates;
   a processor configured to:
      generate the plurality of redacted credit report templates, each of the plurality of redacted credit report templates matching a format of a respective known credit report and not containing personal information, by removing the personal information contained in the respective known credit report;
      generate a detection rule specifying one or more parameters that indicate which portions of sent email messages that are addressed to parties outside of the local organization when compared to one or more of the plurality of redacted credit report templates exceed a minimum document exposure threshold;
      detect whether a sent email addressed to a party outside of the local organization contains an unredacted credit report containing personal information in accordance with the one or more parameters specified by the detection rule; and
      when the sent email contains an unredacted credit report, cause the sent email to be re-routed within the local organization to prevent the sent email from being routed outside of the organization as addressed.

16. The data loss prevention engine of claim 15, wherein the processor is further configured to generate a redacted credit report template from among the plurality of redacted credit report templates by:
   opening an unredacted credit report, which contains personal information and is formatted in portable document format (PDF), via a first software application;
   removing the personal information contained in the unredacted credit report via the first software application to generate a redacted credit report in PDF;
   saving the redacted credit report in PDF via the first software application;
   opening the redacted credit report in PDF with a second software application, the second software application being associated with word processing functionality,
   wherein upon opening the redacted credit report with the second software application, the second software application causes the redacted credit report in PDF to be reflowed and formatted into an editable word processing file; and
   editing and saving the redacted credit report with the second software application to generate the redacted credit report template.

17. The data loss prevention engine of claim 15, wherein the processor is further configured to generate the detection rule by:
   specifying the portions of sent email messages to be matched to one or more of the plurality of credit report templates stored in the memory unit;

specifying content included in the portions of the sent email messages to be matched to content included in one or more of the plurality of credit report templates stored in the memory unit;

specifying file properties of an attached file included in sent email messages that, when present, result in the attached file qualifying for comparison to one or more of the plurality of credit report templates stored in the memory unit; and specifying the minimum document exposure threshold between (i) the content included in portions of the sent email messages, and (ii) content included in each of the plurality of credit report templates stored in the memory unit, which results in the detection of a sent email message containing an unredacted credit report.

18. The data loss prevention engine of claim 17, wherein the processor is further configured to:

compare the content included in portions of the sent email messages as specified by the detection rule to content included in each of the plurality of credit report templates stored in the memory unit; and calculate, for each comparison made between the content included in portions of the sent email messages and content included in each of the plurality of credit report templates, an initial document exposure score, wherein the initial document exposure score is a scaled percentage that indicates, for a higher percentage value, a greater similarity between the content included in portions of the sent email messages and content included in each of the plurality of credit report templates stored in the memory unit.

19. The data loss prevention engine of claim 17, wherein the processor is further configured to:

compare the content included in portions of the sent email messages as specified by the detection rule to content included in each of the plurality of credit report templates stored in the memory unit;

calculate, for each comparison made between the content included in portions of the sent email messages and content included in each of the plurality of credit report templates stored in the memory unit, an initial document exposure score;

flag a sent email message from among the sent email messages as a potentially safe sent email message when none of the comparisons between the content included in the sent email message and content included in each of the plurality of credit report templates stored in the memory unit yields an initial document exposure score above the minimum document exposure threshold;

calculate a secondary document exposure score based upon a presence of one or more keywords and form fields associated with credit reports contained in the portions of the potentially safe sent email message; and when the secondary document exposure score exceeds a detection threshold, re-route the potentially safe sent email message within the local organization to prevent the potentially safe sent email message from being routed outside of the organization as addressed.

20. The data loss prevention engine of claim 19, wherein the processor is further configured to:

generate, from the portions of the potentially safe sent email message, a new redacted credit report template by removing personal information identified in the content included in portions of the potentially safe sent email message; and store the new redacted credit report template with the plurality of redacted credit report templates in the memory unit.

21. The data loss prevention engine of claim 15, wherein the processor is further configured to:

cause the sent email to be re-routed to an internal server within the organization where the sent email is stored as part of a quarantine procedure, and wherein upon the sent email being re-routed within the local organization, an alert message is sent to the sender of the email notifying the sender of the quarantine status of the sent email.

* * * * *